(12) United States Patent
Selvaraj et al.

(10) Patent No.: US 10,761,952 B2
(45) Date of Patent: Sep. 1, 2020

(54) INTELLIGENT FAILOVER MIGRATION ACROSS MULTIPLE HIGH AVAILABILITY STACKS BASED ON QUALITY OF PRIOR FAILOVER MIGRATIONS

(71) Applicant: INTERNATIONAL BUSINESS MACHINES CORPORATION, Armonk, NY (US)

(72) Inventors: Jagadesh Selvaraj, Bangalore (IN); Pramod Vadayadiyil Raveendran, Bangalore (IN); Narasimhan B. Rajagopal, Bangalore (IN); Sajith Kizhakke Veedu, Bangalore (IN); Kuntal Dey, Vasant Kunj (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 15/952,765

(22) Filed: Apr. 13, 2018

(65) Prior Publication Data
US 2019/0317869 A1    Oct. 17, 2019

(51) Int. Cl.
*G06F 11/00* (2006.01)
*G06F 11/20* (2006.01)

(52) U.S. Cl.
CPC ........ *G06F 11/203* (2013.01); *G06F 2201/82* (2013.01)

(58) Field of Classification Search
CPC .... G06F 11/203; G06F 11/709; G06F 11/712; G06F 11/0766; G06F 11/1402; G06F 11/2023; G06F 2201/82
See application file for complete search history.

(56) References Cited

U.S. PATENT DOCUMENTS

| | | | |
|---|---|---|---|
| 7,039,694 B2 | 5/2006 | Kampe et al. | |
| 7,996,529 B2 | 8/2011 | Ahmed et al. | |
| 8,069,141 B2 | 11/2011 | Wetmore et al. | |
| 8,340,699 B2 | 12/2012 | Testone et al. | |
| 8,943,191 B2 | 1/2015 | Coffey et al. | |
| 9,077,580 B1 * | 7/2015 | Randhawa | H04L 67/1097 |
| 9,424,152 B1 * | 8/2016 | Raut | G06F 11/2069 |

(Continued)

FOREIGN PATENT DOCUMENTS

WO    2008153612    12/2008

OTHER PUBLICATIONS

Mell et al., "The NIST Definition of Cloud Computing", NIST, Special Publication 800-145, Sep. 2011, 7 pages.

(Continued)

*Primary Examiner* — Joseph D Manoskey
(74) *Attorney, Agent, or Firm* — William Hartwell; Andrew D. Wright; Roberts Calderon Safran & Cole, P.C.

(57) ABSTRACT

A computer-implemented method includes: monitoring, by a computing device, failover data from one or more high availability stacks, wherein the failover data includes data associated with prior failovers associated with the one or more high availability stacks; scoring, by the computing device, a plurality of prior failovers identified in the failover data; generating, by the computing device, a failover instruction for implementing a failover based on the scoring; and causing, by the computing device, and based on the failover instruction, an application to migrate from a target cluster to a destination cluster.

20 Claims, 8 Drawing Sheets

(56) References Cited

U.S. PATENT DOCUMENTS

| | | |
|---|---|---|
| 2008/0263390 A1* | 10/2008 | Baba .................. G06F 11/2028 714/4.1 |
| 2016/0239746 A1 | 8/2016 | Yu |
| 2016/0239857 A1 | 8/2016 | Milton et al. |
| 2016/0267397 A1 | 9/2016 | Carlsson |
| 2016/0275152 A1 | 9/2016 | Gunjan et al. |
| 2016/0283335 A1 | 9/2016 | Yao et al. |
| 2016/0292592 A1 | 10/2016 | Patthak et al. |
| 2016/0292593 A1 | 10/2016 | Agarwalla et al. |
| 2016/0292769 A1 | 10/2016 | Colson et al. |
| 2016/0300156 A1 | 10/2016 | Bowers et al. |
| 2016/0314014 A1 | 10/2016 | Dow et al. |
| 2016/0314408 A1 | 10/2016 | Gulwani et al. |
| 2016/0321562 A1 | 11/2016 | Zeng |

OTHER PUBLICATIONS

"Can Machine Learning Prevent Application Downtime?", NimbleStorage, 2016, 5 pages.

M. Arnold et al, Abstract of "META: Middleware for Events, Transactions, and Analytics", (IBM)IBM Journal of Research and Development, vol. 60, Issue: 2-3, Mar.-May 2016, 1 page.

\* cited by examiner

INTELLIGENT FAILOVER MIGRATION ACROSS MULTIPLE HIGH AVAILABILITY STACKS BASED ON QUALITY OF PRIOR FAILOVER MIGRATIONS

BACKGROUND

The present invention generally relates to migrating failovers across multiple high availability stacks and, more particularly, to intelligently migrating failovers based on the quality of prior failover migrations.

"High availability" (HA) is a characteristic of a computer system, which aims to ensure an agreed level of operational performance, usually uptime, for a higher than normal period. A high availability system includes a high availability stack having redundant clusters that may be used for failover. High availably clusters are groups of computers that support server applications that can be reliably utilized with a minimum amount of down-time. High availably clusters operate by using high availability software to harness redundant computers in groups or clusters that provide continued service when system components fail. Without clustering, if a server running a particular application crashes, the application will be unavailable until the crashed server is fixed. High availably clustering remedies this situation by detecting hardware/software faults, and immediately restarting the application on another system without requiring administrative intervention, a process known as failover. As part of this process, clustering software may configure the node before starting the application on it. For example, appropriate file systems may need to be imported and mounted, network hardware may have to be configured, and some supporting applications may need to be running as well.

SUMMARY

In an aspect of the invention, a computer-implemented method includes: monitoring, by a computing device, failover data from one or more high availability stacks, wherein the failover data includes data associated with prior failovers associated with the one or more high availability stacks; scoring, by the computing device, a plurality of prior failovers identified in the failover data; generating, by the computing device, a failover instruction for implementing a failover based on the scoring; and causing, by the computing device, and based on the failover instruction, an application to migrate from a target cluster to a destination cluster.

In an aspect of the invention, there is a computer program product for optimizing failovers, the computer program product comprising a computer readable storage medium having program instructions embodied therewith. The program instructions are executable by the computing device to cause the computing device to: generate a respective plurality of scores for a plurality of prior failovers within one or more high availability stacks; detect a failover trigger for failing over an application from a target application server cluster to one of a plurality of destination application server clusters; select a particular destination application server cluster of the plurality of destination application server clusters based on the respective plurality of scores and the detecting the failover trigger; generate a failover instruction that causes the application to migrate from the target application server to the selected particular destination application server cluster.

In an aspect of the invention, a system includes: a CPU, a computer readable memory and a computer readable storage medium associated with a computing device; program instructions to identify attributes of a failover; program instructions to track migration time of the failover; program instructions to track performance of applications and services after migration of the failover; program instructions to track uptime of migrated applications and services; program instructions to score the failover based on the migration time, the performance, and the uptime, wherein the score indicates a quality of the failover; program instructions to generate a record that associates the attributes of the failover with the score; program instructions to generate a failover instruction for a future failover based on the score and one or more other scores associated with other failovers; and program instructions to output the failover instruction to implement the future failover by causing an application to migrate from a target application server to a destination application server cluster. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
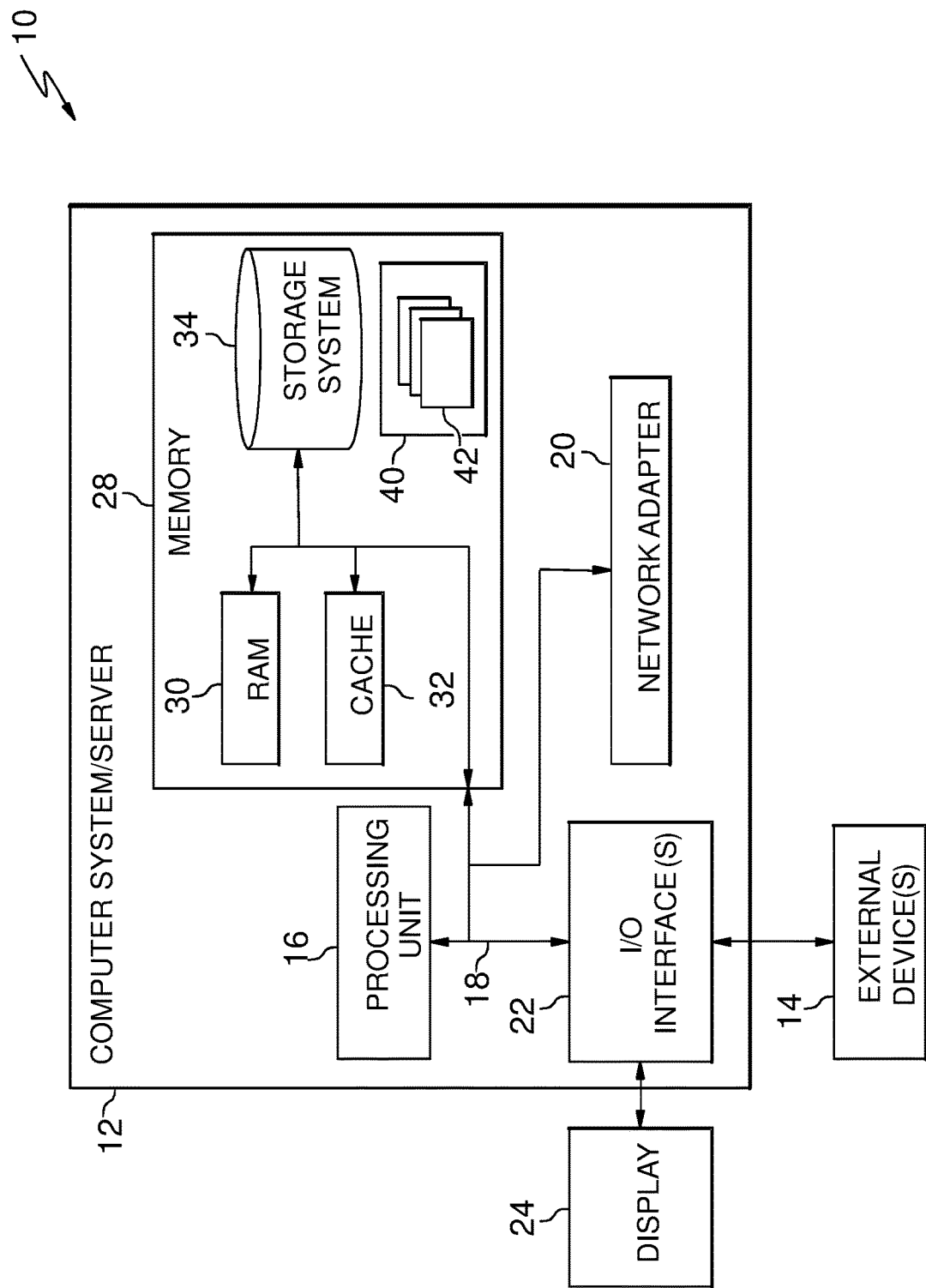
FIG. 1 depicts a cloud computing node according to an embodiment of the present invention.

The present invention generally relates to migrating failovers across multiple high availability stacks and, more particularly, to intelligently migrating failovers based on the quality of prior failover migrations. In a high availability system, an application server cluster that hosts services or applications may be migrated (or failed over) to an available back-up application server cluster in the event of a failure. Aspects of the present invention may track, over a period of time, data and attributes regarding failovers from a target cluster to a destination cluster, score the quality of each failover, and implement future failovers based on the quality of prior or historical failovers. In this way, when a failure of an application cluster occurs, failover or migration of the application cluster may be optimized in a manner that minimizes downtime and maximizes reliability, as determined based on historical failover data.

Aspects of the present invention may track attributes of failovers from a target cluster to a destination cluster, and implement machine learning techniques to determine optimal failover or migration instructions for future failovers based on the attributes of prior failovers, and attributes of an impending failover. For example, aspects of the present invention may determine that failovers of an application cluster having a first set of attributes (e.g., application clusters hosting a particular set of services, associated with a particular service provider, serving a particular set of customers, etc.) have historically had a highest score and performed best (e.g., has had minimum downtime, fastest migration time, highest reliability, etc.) when that application cluster has been failed over or migrated to an application cluster having a second set of attributes (e.g., network location, physical location, computing resources, application capabilities, etc.). Accordingly, aspects of the present invention may generate failover instructions such that when, in the future, an application cluster having a first set of attributes fails over to an application cluster having the second set of attributes (e.g., an optimal set of attributes for the type of application cluster that failed). That is to say, each destination application cluster having a particular set of attributes may be scored (or alternatively, each set of attributes may be scored). As described herein, an application cluster having an optimal set of attributes (e.g., the highest score) may be selected for migration. Aspects of the present invention may also factor in external data when generating scores and failover instructions, such as data from knowledge bases describing best practices, updated software patches, customer preferences, etc.

As described herein, an initial learning phase may be implemented in which failovers are initially performed using a default set of criteria, manually via an administrator, or via some other technique. As failovers occur over time, aspects of the present invention may track the performance of each failover with respect to, for example, migration time, failure rate during the migration, follow-up failure rate and up-time after migration, etc. Aspects of the present invention may score each failover having a particular set of attributes based on the performance. Once an initial set of failover data has been gathered and failovers have been scored, migration instructions for future failovers can be generated and optimized based on the scores and the prior failover data. In this way, when a failure of an application cluster occurs, the application cluster can be migrated or failed over in a manner that minimizes downtime and maximizes reliability, as determined based on historical failover data. For example, a failover instruction may be generated to migrate an application server based on the highest scored prior failovers. Also, failover scores may be generated and weighted based on a variety of factors, such as migration time, failure rate during the migration, follow-up failure rate and up-time after migration, industry best practice updates, updated software patches, customer requirements/preferences, cost considerations, etc.

Aspects of the present invention may also consolidate failover tasks across multiple different high availability stacks associated with different applications, vendors, and/or service providers. Further, failover data from one high availability stack may be used to optimize a failover in a different high availability stack. In this way, a wide range of fail over data across different high availability stacks may be used to optimize failover over migrations. Also, application server clusters from one high availability stack may be used as a failover cluster for an application hosted by a different high availability stack. In this way, computing resources are better optimized as a larger selection of computing resources are made available for failover.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
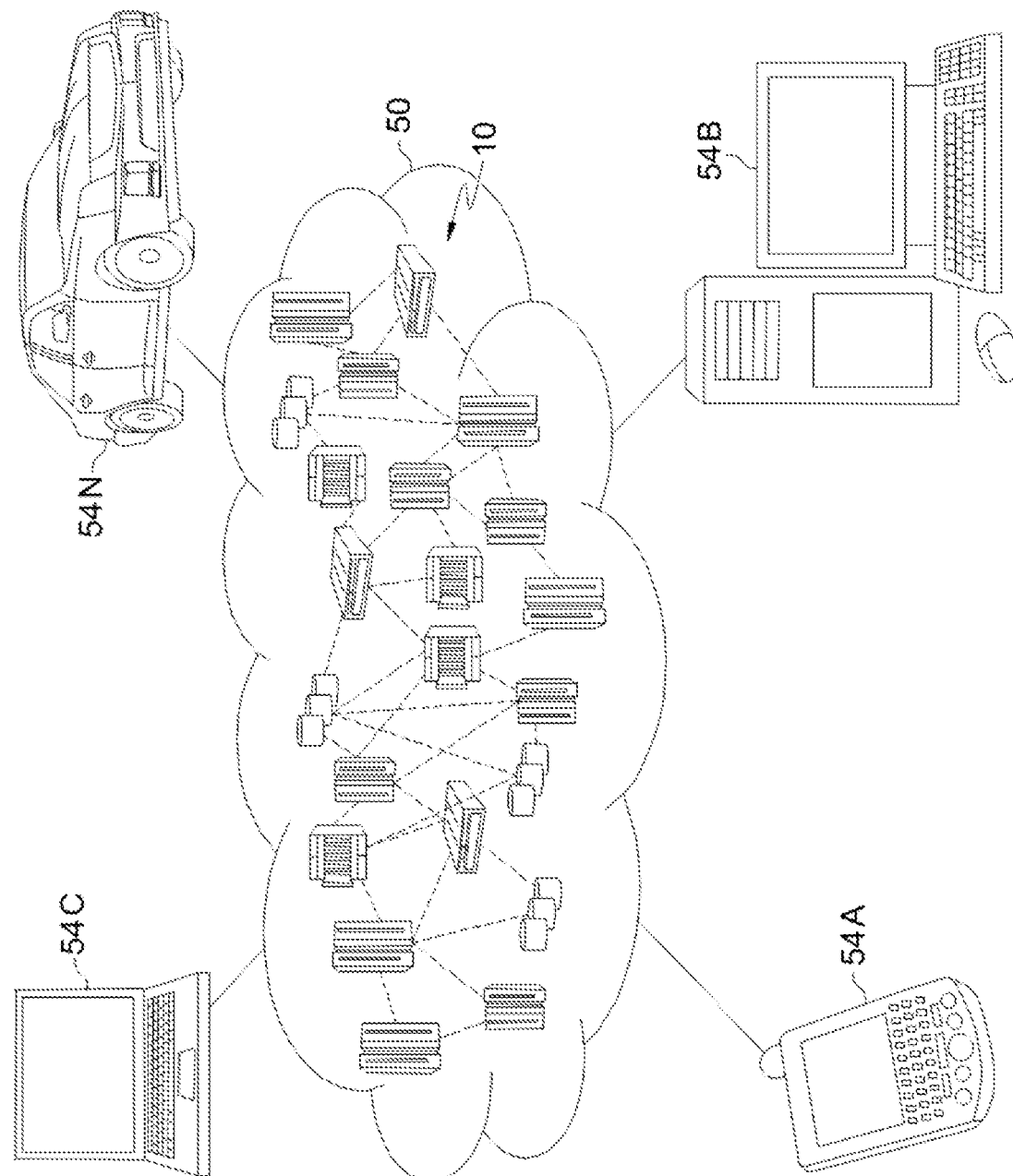
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
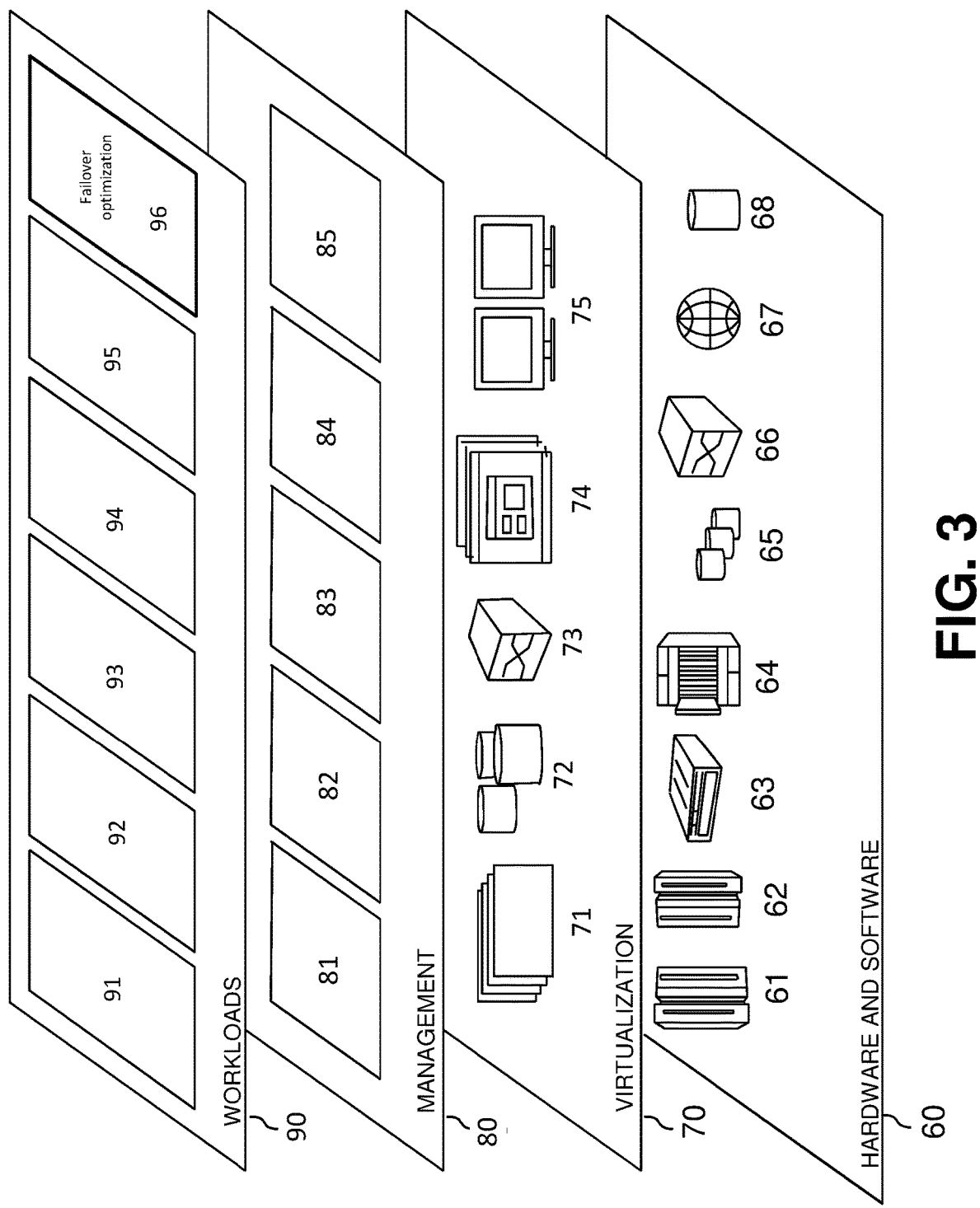
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and failover optimization 96.

Referring back to FIG. 1, the program/utility 40 may include one or more program modules 42 that generally carry out the functions and/or methodologies of embodiments of the invention as described herein (e.g., such as the functionality provided by failover optimization 96). Specifically, the program modules 42 may monitor failover data from high availability stacks, score each failover over a learning period, store scores for each failover, detect a failover trigger, generate an optimal failover instruction or recommendation, and output the instruction and/or recommendation. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of high availability failover optimization system 220 as shown in FIG. 4.

Figure 4:
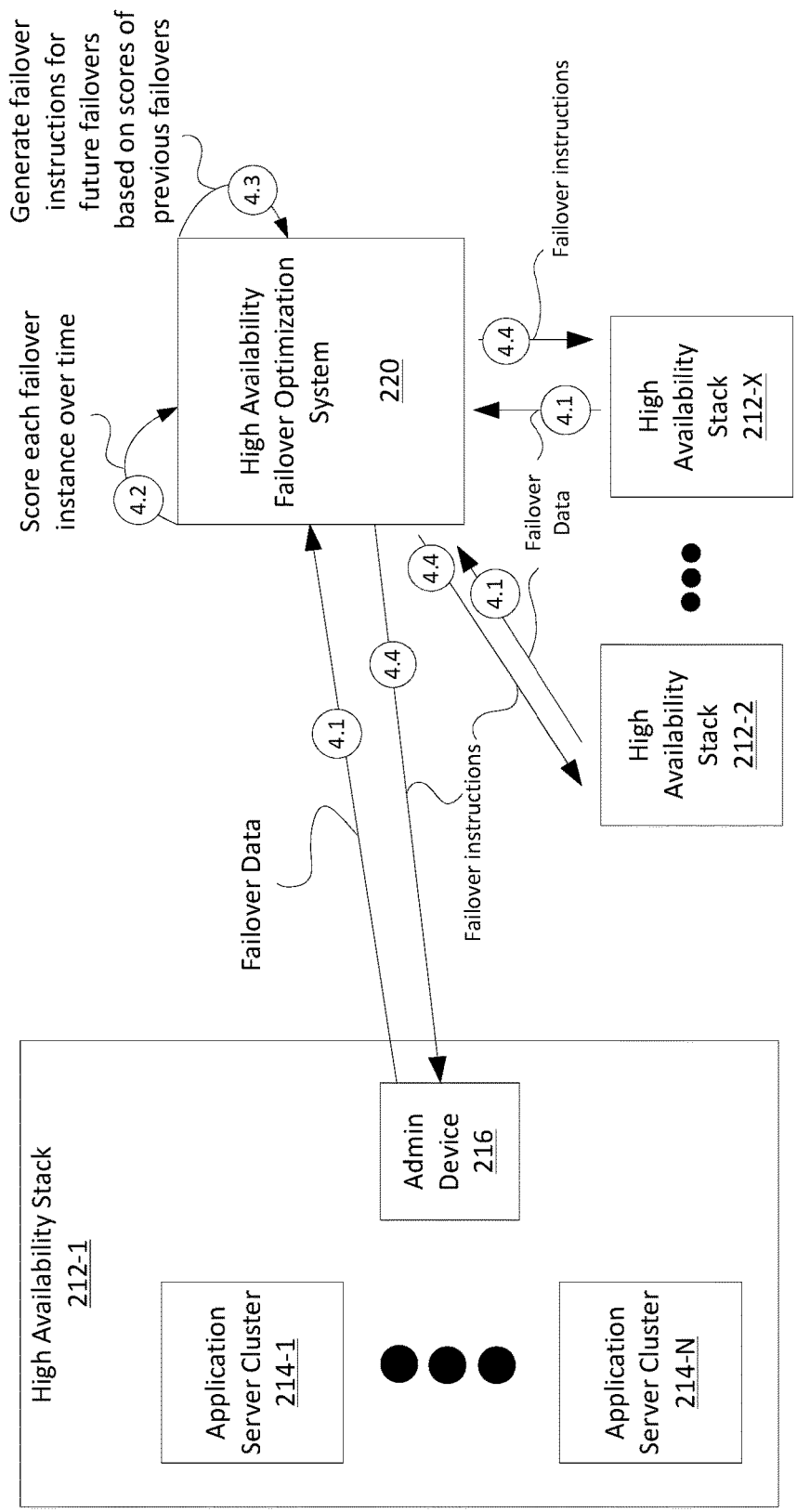
FIG. 4 shows an overview of an example implementation in accordance with aspects of the present invention

FIG. 4 shows an overview of an example implementation in accordance with aspects of the present invention. As shown in FIG. 4, a high availability failover optimization system 220 may communicate with multiple high availability stacks 212 (e.g., high availability stack 212-1 through high availability stack 212-X, where X is greater than 1). Each high availability stack 212 may include multiple application server clusters 214 and an admin device 216. The application server clusters 214 may host an application or service and may also be used for failover. The admin device 216 may be used to manage failovers within a high availability stack 212, track failover data within the high availability stack 212, and implement failovers within the high availability stack 212.

As further shown in FIG. 4, at steps 4.1, the high availability failover optimization system 220 may receive failover data from each high availability stack 212 (e.g., each admin device 216 within each high availability stack 212). The failover data may include attributes of each failover. For example, the failover data for one failover may identify when the failover occurred, which application server cluster 214 had failed, the applications/services that were hosted by the failed application server cluster 214, the hardware configuration of the application server cluster 214, the uptime prior to failing, the destination application server cluster 214 used as a destination to restore the applications/services, the migration time for restoring services, and/or the performance of the migration with respect to performance metrics (e.g., processing speed of requested services, error rates, etc.), the uptime of the migrated applications/services, etc. As shown in FIG. 4, the high availability failover optimization system 220 may receive failover data from multiple high availability stacks 212. At step 4.2, the high availability failover optimization system 220 may score each failover instance over a period of time (e.g., over a learning period). At step 4.3, the high availability failover optimization system 220 may generate failover instructions for future failovers based on the scores of previous failovers, and at steps 4.4, the high availability failover optimization system 220 may output failover instructions to the high availability stacks 212 when a failover is required (e.g., when an application server cluster 214 within a high availability stack 212 has failed or is predicted to fail).

As described herein, the failover instructions may optimize migration of future failovers based on the attributes of the failovers (e.g., to minimize downtime, maximize performance, etc.). Since the high availability failover optimization system 220 tracks failover data over a period of time, the high availability failover optimization system 220 continues to "learn" and update optimal failover instructions based on the performance and quality of prior failovers. Further, failover instructions can be further optimized based on external data, such as data from knowledge bases describing best practices, updated software patches, customer preferences, etc. In embodiments, the failover instructions may identify a destination application server cluster 214 to use for failover in which the destination application server cluster 214 includes an optimal set of attributes (e.g., hardware/software configuration, network location, physical location, etc.) that previously resulted in an optimal migration (e.g., a migration with the best combination of downtime, migration time, reliability, cost, etc.).

Figure 5:
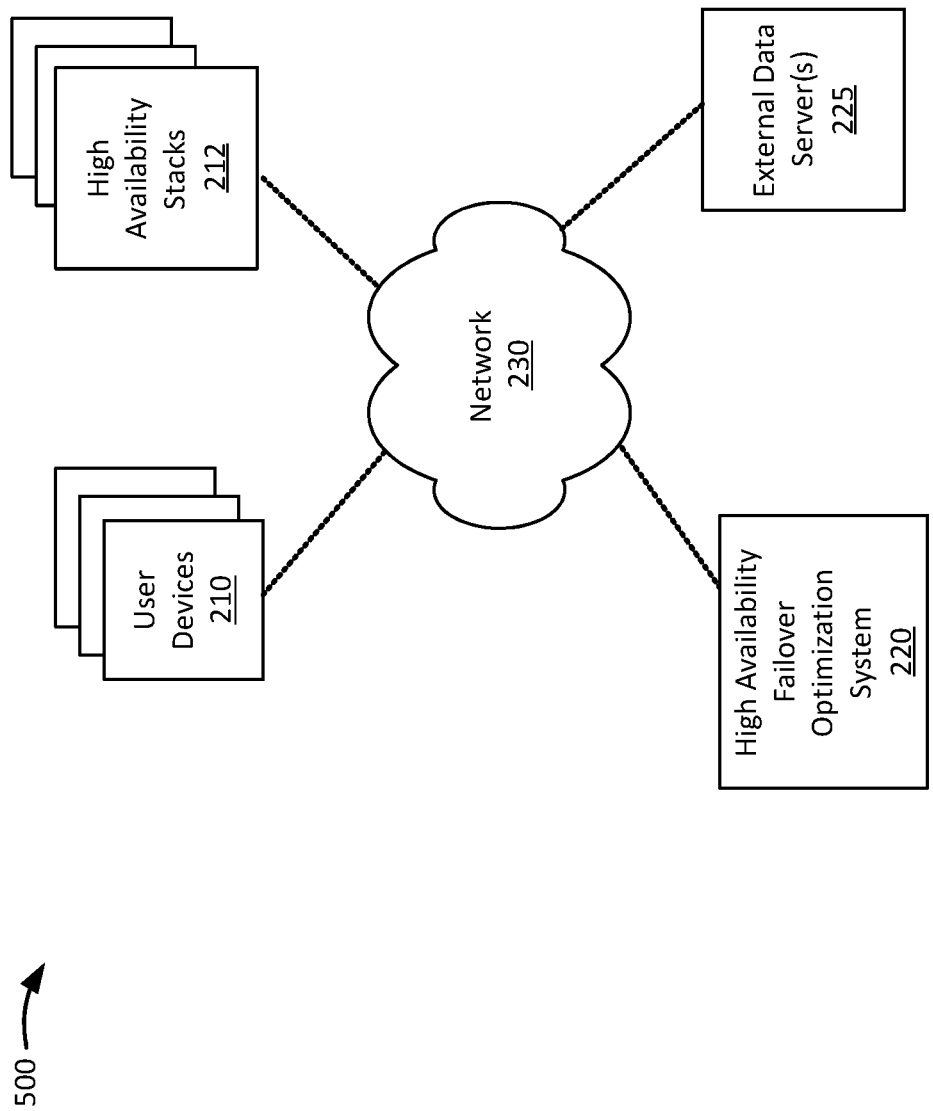
FIG. 5 shows an example environment in accordance with aspects of the present invention.

FIG. 5 shows an example environment in accordance with aspects of the present invention. As shown in FIG. 5, environment 500 may include user devices 210, high availability stacks 212, high availability failover optimization system 220, external data server 225, and network 230. In embodiments, one or more components in environment 500 may correspond to one or more components in the cloud computing environment of FIG. 2. In embodiments, one or more components in environment 500 may include the components of computer system/server 12 of FIG. 1.

Each user device 210 may include a device capable of communicating via a network, such as the network 230. For example, each user device 210 may correspond to a mobile communication device (e.g., a smart phone or a personal digital assistant (PDA)), a portable computer device (e.g., a laptop or a tablet computer), a desktop computer device, a server device or another type of device. In some embodiments, each user device 210 may be used to access applications and/or services hosted by one or more high availability stacks 212.

The high availability stacks 212 may include multiple computing devices (e.g., application servers, failover clusters, admin devices, etc.) that host an application or service accessible by the user device 210. In embodiments, each high availability stack 212 may implement high availability failover techniques to minimize the downtime applications and services. Each high availability stack 212 may provide failover data to the high availability failover optimization system 220, as described herein. Each high availability stack 212 may include one more application server clusters 214 and one more admin devices 216. The application server cluster 214 may include a physical server cluster and/or a virtual server cluster.

The high availability failover optimization system 220 may include one or more computing devices (e.g., such as computer system/server 12 of FIG. 1) that monitors failover data from the high availability stacks 212, scores each failover, and optimizes instructions for implementing future failovers having a particular set of attributes based on the scores of past failovers having the set of attributes. As described herein, the high availability failover optimization system 220 may generate scores based on the performance and/or quality of prior failovers. Additionally, or alternatively, the high availability failover optimization system 220 may generate scores based on weighted factors, such as migration time, failure rate during the migration, follow-up failure rate and up-time after migration, industry best practice updates, updated software patches, customer requirements/preferences, cost considerations, etc. The high availability failover optimization system 220 may generate instructions to migrate or fail over a failed application cluster having a first set of attributes to an application cluster having a second set of attributes (e.g., an optimal set of attributes for the type of application cluster that failed).

The external data server 225 may include one or more computing devices (e.g., such as computer system/server 12 of FIG. 1) that stores external data that the high availability failover optimization system 220 may use to score failovers and/or generate optimal failover instructions. For example, the external data server 225 may store information relating to knowledge bases describing best practices, updated software patches, customer preferences, etc.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
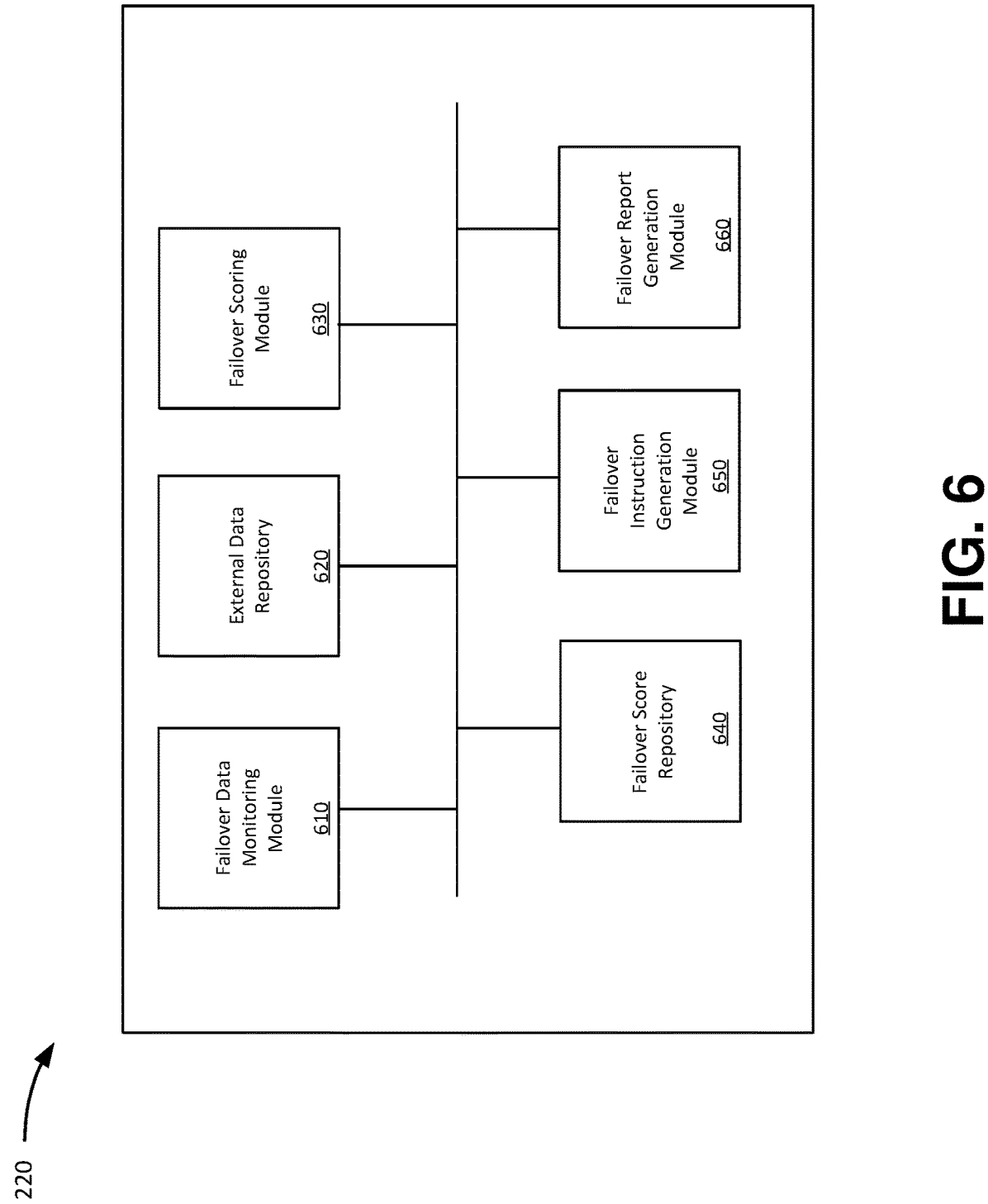
FIG. 6 shows a block diagram of example components of a high availability failover optimization system in accordance with aspects of the present invention.

FIG. 6 shows a block diagram of example components of a high availability failover optimization system 220 in accordance with aspects of the present invention. As shown in FIG. 6, the high availability failover optimization system 220 may include a failover data monitoring module 610, an external data repository 620, a failover scoring module 630, a failover score repository 640, a failover instruction generation module 650, and a failover report generation module 660. In embodiments, the high availability failover optimization system 220 may include additional or fewer components than those shown in FIG. 6. In embodiments, separate components may be integrated into a single computing component or module. Additionally, or alternatively, a single component may be implemented as multiple computing components or modules.

The failover data monitoring module 610 may include a program module (e.g., program module 42 of FIG. 1) that receives and monitors failover data from one or more high availability stacks 212. For example, for each failover within a high availability stack 212, the failover data monitoring module 610 may track attributes of the failover, such as when the failover occurred, which application server cluster 214 had failed, the applications/services that were hosted by the failed application server cluster 214, the hardware configuration of the application server cluster 214, the uptime prior to failing, the destination application server cluster 214 used as a destination to restore the applications/services, the migration time for restoring services, and/or the performance of the migration with respect to performance metrics (e.g., processing speed of requested services, error rates, etc.).

The external data repository 620 may include a data storage device (e.g., storage system 34 of FIG. 1) that stores external data that may be used to score failovers and generate optimal failover instructions. In embodiments, information stored by the external data repository 620 may be received from the external data server 225. In embodiments, the external data repository 620 may store information relating to knowledge bases describing best practices for implementing failovers, updated software patches that affect how failover is implemented, customer preferences that may affect how a failover is handled, hardware configuration data for different application clusters, etc. Additionally, or alternatively, the external data repository 620 may store information regarding agreements and/or permissions between different service providers associated with different high availability stacks 212 to share application clusters for failover. Based on the permissions, a cluster from one high availability stack 212 may be used as a failover to host an application or service from a different high availability stack 212.

The failover scoring module 630 may include a program module (e.g., program module 42 of FIG. 1) that scores a failover based on failover data received and monitored by the failover data monitoring module 610, and based on external data stored by the external data repository 620. In embodiments, the failover scoring module 630 may score a failover based on the quality and/or performance of the failover. More specifically, the failover scoring module 630 may score a failover by tacking attributes of the failover, such as the migration time to migrate a failed cluster into a different cluster, the performance of applications and services after the completion of a migration, the failure rate of a cluster after migration has been completed, etc. Additionally, or alternatively, the failover scoring module 630 may score the failover by factoring in external data stored by the external data repository 620. Further, the failover scoring module 630 may generate a score for each failover based on the attributes of a destination application server cluster 214 in which an application or service was migrated. That is to say, each destination application server cluster 214 having a particular set of attributes may be scored (or alternatively, each set of attributes may be scored). As described herein, an application server cluster 214 having an optimal set of attributes (e.g., the highest score) may be selected for migration.

As described herein, the score may indicate the quality of a failover when an application cluster having a first set of attributes (e.g., application clusters hosting a particular set of services, associated with a particular service provider, serving a particular set of customers, etc.) is migrated or failed over to an application cluster having a second set of attributes (e.g., network location, physical location, computing resources, application capabilities, etc.). In embodiments, the quality of the failover may relate to downtime, migration time, reliability, etc. Additionally, or alternatively, the quality of the failover may be based on a level to which the failover confirms to customer requirements (e.g., downtime requirements, resource cost requirements, etc.).

In embodiments, the failover scoring module 630 may apply weights when generating the scores based on different weightings that may be set by an administrator. For example, for certain applications and services, reliability may be higher weighted than resource cost, or migration time. Accordingly, failovers that have a higher reliability (as determined by monitoring the attributes of the failovers by the failover data monitoring module 610), are scored relatively higher. For other applications, downtime may be weighted higher than resource cost. Accordingly, failovers that have a lower downtime (as determined by monitoring the attributes of the failovers by the failover data monitoring module 610), are scored relatively higher.

The failover score repository 640 may include a data storage device (e.g., storage system 34 of FIG. 1) that stores failover scores (e.g., in a data structure). In embodiments, each entry or record in the data structure may identify a failover, the attributes of the failover (e.g., attributes of a target or failed application server cluster 214 and attributes of a destination application server cluster 214 in which the target was failed over) and the score of the failover. Information stored by the failover score repository 640 may include the scores generated by the failover scoring module 630.

The failover instruction generation module 650 may include a program module (e.g., program module 42 of FIG. 1) that generates an optimal failover instruction based on detecting that a failover should occur (e.g., when an application server cluster 214 has failed or is predicted to fail). In embodiments, the failover instruction generation module 650 may determine the attributes of the application server cluster 214 to be failed over or migrated to another application server cluster 214. The failover instruction generation module 650 may access the failover scores stored by the failover score repository 640, look up the attributes of the application server cluster 214 to be failed over, and identify the failover having the highest score for the set of attributes. The failover instruction generation module 650 may generate optimal failover instructions such that the application server cluster 214 is failed over in the same manner as that of the failover with the same attributes and having the highest score. In this way, the failover instructions cause the failed application server cluster 214 to failover in a manner that is scored the highest (e.g., the highest quality failover with the best combination of downtime, migration time, reliability, cost, etc.).

In embodiments, the failover instructions may identify a destination application server cluster 214 to use for failover in which the destination application server cluster 214 includes an optimal set of attributes that previously resulted in an optimal migration (e.g., a migration with the best combination of downtime, migration time, reliability, cost, etc.). In embodiments, the destination application server cluster 214 may be a physical server cluster, or a virtual cluster. The failover instructions may include provisioning information to provision a physical server cluster and/or a virtual image associated with a virtual server cluster with an optimal set of attributes (e.g., a set of attributes having the highest failover score). Additionally, or alternatively, the failover instruction may include a selection of a destination application server cluster 214 having optimal attributes as determined based on a configuration database identifying the attributes of different available application server clusters 214. The failover instruction generation module 650 may output the failover instruction to an admin device 216 associated with a high availability stack 212 of the failed application server cluster 214 so that the admin device can manage and implement the failover in accordance with the instructions received from the failover instruction generation module 650.

The failover report generation module 660 may include a program module (e.g., program module 42 of FIG. 1) that generates a report including recommendations corresponding to the optimal failover instructions generated by the failover instruction generation module 650. For example, in embodiments, in addition, or in alternative to failover instruction generation module 650 outputting the optimal failover instructions to different high availability stacks 212, the failover report generation module 660 may generate the report and output the report to allow an administrator review the optimal failover instructions. The administrator may elect to incorporate the instructions, modify the instructions, or delay failover as needed or desired.

Figure 7:
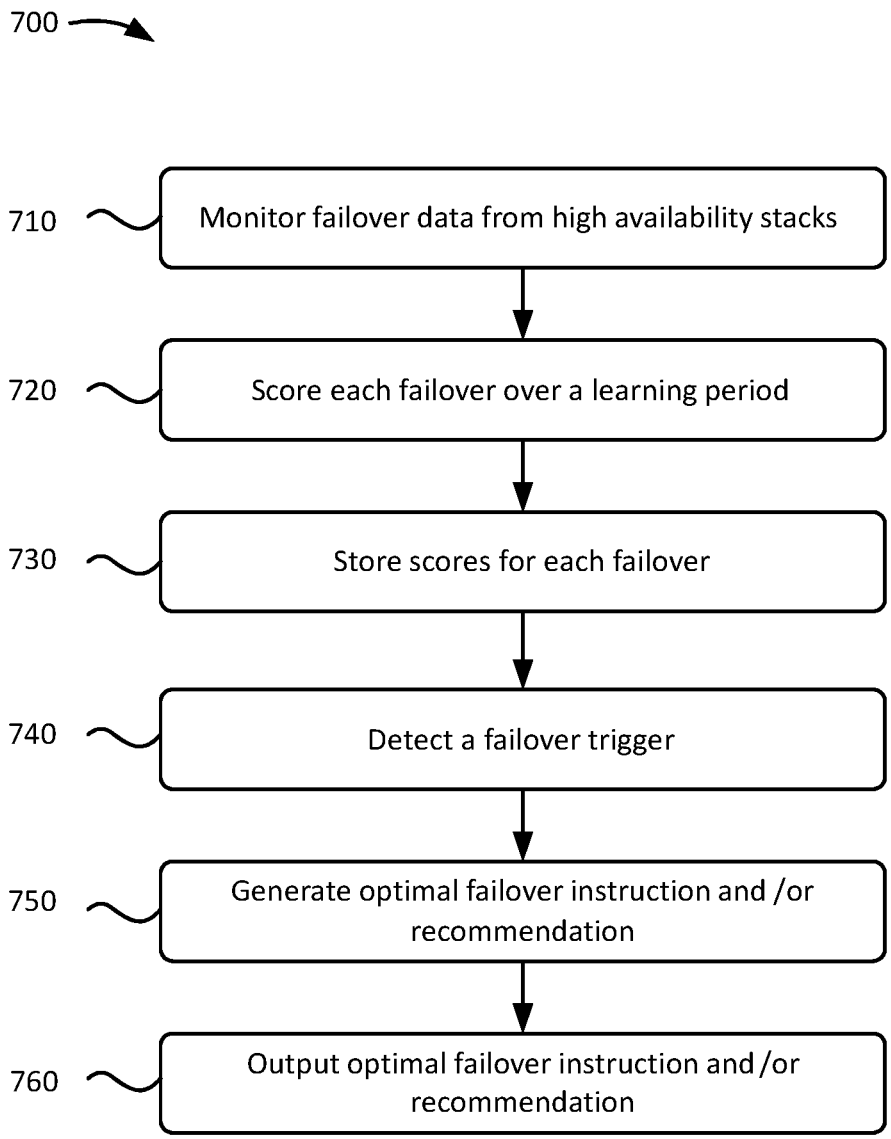
FIG. 7 shows an example flowchart for a process for generating optimal failover instructions based on historical failover data and scores representing the quality of previous failovers in accordance with aspects of the present invention.

FIG. 7 shows an example flowchart of a process for generating optimal failover instructions based on historical failover data and scores representing the quality of previous failovers. The steps of FIG. 7 may be implemented in the environment of FIGS. 4-6, for example, and are described using reference numbers of elements depicted in FIGS. 4-6. As noted above, the flowchart illustrates the architecture, functionality, and operation of possible implementations of systems, methods, and computer program products according to various embodiments of the present invention.

As shown in FIG. 7, process 700 may include monitoring failover data from high availability stacks (step 710). For example, as described above with respect to the failover data monitoring module 610, the high availability failover optimization system 220 may receive and monitor failover data from one or more high availability stacks 212. For example, for each failover within a high availability stack 212, the high availability failover optimization system 220 may track attributes of the failover, such as when the failover occurred, which application server cluster 214 had failed, the applications/services that were hosted by the failed application server cluster 214, the hardware configuration of the application server cluster 214, the uptime prior to failing, the destination application server cluster 214 used as a destination to restore the applications/services, the migration time for restoring services, and/or the performance of the migration with respect to performance metrics (e.g., processing speed of requested services, error rates, etc.).

Process 700 may also include scoring each failover over a learning period (step 720). For example, as described above with respect to the failover scoring module 630, the high availability failover optimization system 220 may score a failover based on failover data received and monitored by the failover data monitoring module 610 (e.g., at step 710), and based on external data stored by the external data repository 620. In embodiments, the high availability failover optimization system 220 may score a failover based on the quality and/or performance of the failover. More specifically, the high availability failover optimization system 220 may score a failover by tacking attributes of the failover, such as the migration time to migrate a failed cluster into a different cluster, the performance of applications and services after the completion of a migration, the failure rate of a cluster after migration has been completed, etc. Additionally, or alternatively, the high availability failover optimization system 220 may score the failover by factoring in external data stored by the external data repository 620. Additional details regarding the scoring of each failover are described herein with respect to the failover scoring module 630, and in FIG. 8.

In embodiments, the high availability failover optimization system 220 may score each failover during an initial learning period in which failovers are managed via default processes and/or manually. As described herein, after the initial learning period, the scores are used to optimize future failovers based on the performance and quality of historical or previous failovers.

Process 700 may further include storing scores for each failover (step 730). For example, as described above with respect to the failover score repository 640, the high availability failover optimization system 220 may store the scores (e.g., generated at step 720) in a data structure. In embodiments, each entry or record in the data structure may identify a failover, the attributes of the failover (e.g., attributes of a target or failed application server cluster 214 and attributes of a destination application server cluster 214 in which the target was failed over) and the score of the failover.

Process 700 may also include detecting a failover trigger (step 740). For example, as described above with respect to the failover instruction generation module 650, the high availability failover optimization system 220 may detect a failover trigger (e.g., an event that triggers a failover). In embodiments, a failover trigger may include a manual instruction (e.g., from an administrator or operator) to initiate a failover. Additionally, or alternatively, a failover trigger may include a time-based trigger in which a failover is set to occur at periodic intervals. Additionally, or alternatively, a failover trigger may be based on performance metrics and/or performance trends that indicate that an application server cluster 214 is predicted to fail. Additionally, or alternatively, a failover trigger may include an event that is predicted to cause heavy usage load on applications and services (e.g., after major software updates, during high-congestion periods, etc.).

Process 700 may further include generating optimal failover instructions and/or a recommendation (step 750). For example, as described above with respect to the failover instruction generation module 650, the high availability failover optimization system 220 may generate an optimal failover instruction based on detecting the failover trigger (e.g., at step 740). In embodiments, the high availability failover optimization system 220 may determine the attributes of the application server cluster 214 to be failed over or migrated to another application server cluster 214. The high availability failover optimization system 220 may access the failover scores stored by the failover score repository 640, look up the attributes of the application server cluster 214 to be failed over, and identify the failover having the highest score for the set of attributes. The high availability failover optimization system 220 may generate optimal failover instructions such that the application server cluster 214 is failed over in the same manner as that of the failover with the same attributes and having the highest score. As described above with respect to the failover report generation module 660, the high availability failover optimization system 220 may generate a report including recommendations corresponding to the optimal failover instructions.

Process 700 may also include outputting the optimal failover instruction and/or recommendation (step 760). For example, as described above with respect to the failover instruction generation module 650 and the failover report generation module 660, the high availability failover optimization system 220 may output the failover instruction to an admin device 216 associated with a high availability stack 212 of the failed application server cluster 214 so that the admin device can manage and implement the failover in accordance with the instructions received from the failover instruction generation module 650. In embodiments, in addition, or in alternative to high availability failover optimization system 220 outputting the optimal failover instructions to different high availability stacks 212, the high availability failover optimization system 220 may generate the report and output the report to allow an administrator review the optimal failover instructions. The administrator may elect to incorporate the instructions modify the instructions, or delay failover as needed or desired. When a failover is implemented based on the failover instructions, (e.g., when applications/services are migrated to a destination application server cluster 214), that failover may be also tracked and scored and used to update future failover instructions in accordance with process 700.

Figure 8:
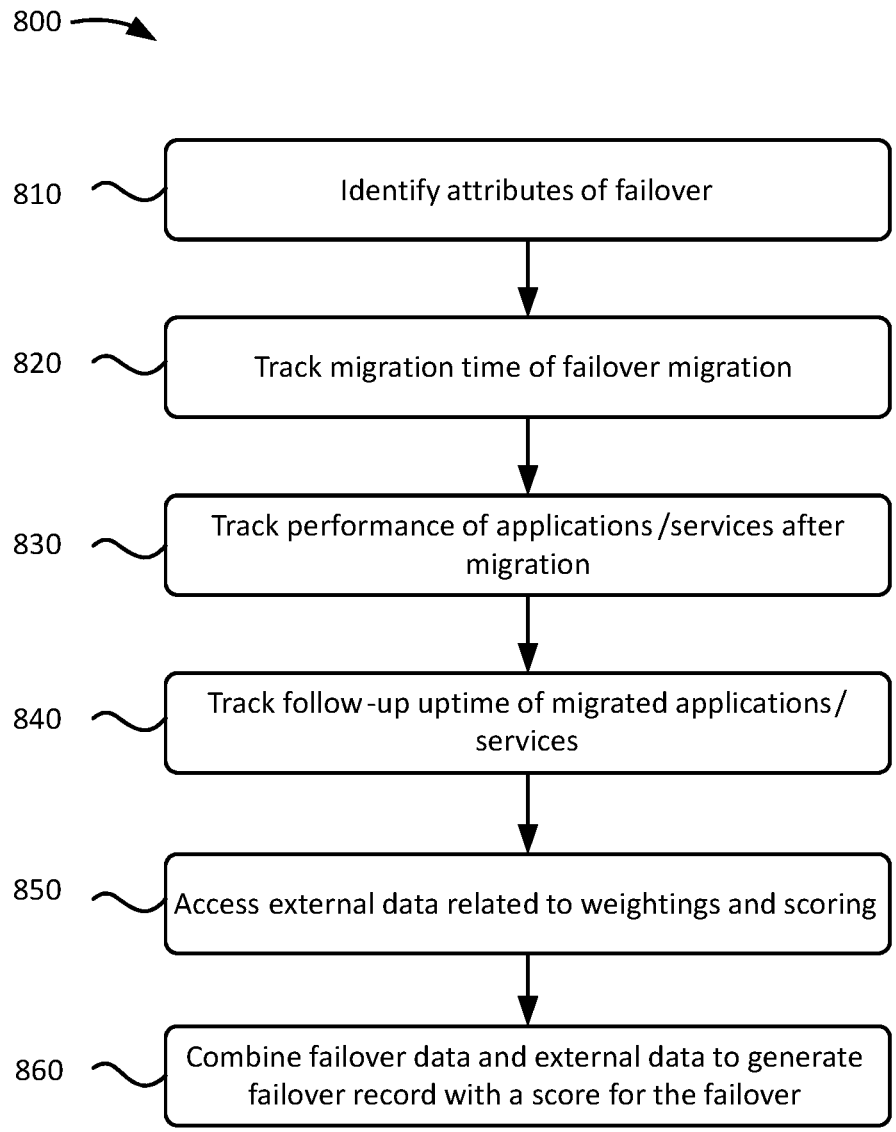
FIG. 8 shows an example flowchart of a process for scoring a failover in accordance with aspects of the present invention.

FIG. 8 shows an example flowchart of a process for scoring a failover. The steps of FIG. 8 may be implemented in the environment of FIGS. 4-6, for example, and are described using reference numbers of elements depicted in FIGS. 4-6. The process 800 of FIG. 8 may include sub-steps of one or more of the steps shown in process 700 of FIG. 7. In particular, process 800 may correspond to sub-steps for process step 720 in FIG. 7. As noted above, the flowchart illustrates the architecture, functionality, and operation of possible implementations of systems, methods, and computer program products according to various embodiments of the present invention.

As shown in FIG. 8, process 800 may include identifying attributes of a failover (step 810). For example, as described above with respect to the failover data monitoring module 610, the high availability failover optimization system 220 may determine failover attributes, such as when the failover occurred, which application server cluster 214 had failed, the applications/services that were hosted by the failed application server cluster 214, the hardware configuration of the application server cluster 214, the uptime prior to failing, the destination application server cluster 214 used as a destination to restore the applications/services, etc.

Process 800 may also include tracking the migration time of the failover migration (step 820). For example, as described above with respect to the failover data monitoring module 610, the high availability failover optimization system 220 may track the migration time to complete migrating applications/services from the failed application server cluster 214 (e.g., the target application server cluster 214) to the destination application server cluster 214 (e.g., the application server cluster 214 used to restore the applications/services). In embodiments, lower migration times results to higher failover scores.

Process 800 may further include tracking the performance of applications/services after migration (step 830). For example, as described above with respect to the failover data monitoring module 610, the high availability failover optimization system 220 may track the performance of applications/services after migration with respect to performance metrics (e.g., processing speed of requested services, error rates, etc.). In embodiments, higher performance in relation to the performance metrics results to higher failover scores.

Process 800 may also include tracking the follow-up uptime of migrated applications/services (step 840). For example, as described above with respect to the failover data monitoring module 610, the high availability failover optimization system 220 may track the up-time of migrated applications/services after migration to the destination application server cluster 214. In embodiments, longer uptime results in a higher score for the failover.

Process 800 may further include accessing external data related to future failover instructions and weightings (step 850). For example, as described above with respect to the failover score repository 640, the high availability failover optimization system 220 may access external data (e.g., stored by the external data repository 620 and/or the external data servers 225). In embodiments, the high availability failover optimization system 220 may parse the external data using parsing rules and/or natural language processing techniques to determine which external data is related to future failover instructions. For example, the high availability failover optimization system 220 may identify external data hosted on blogs, social media pages, software release pages, etc. to determine information such as industry best practices, software updates, customer requirements, etc. that may relate to scoring failovers and determining optimal attributes of destination application server clusters 214.

In embodiments, the external data may include information identifying weightings or attributes to prioritize. For example, an administrator may provide, to the high availability failover optimization system 220, information identifying the weightings or priorities, such as priorities relating to resource cost, downtime requirements, performance requirements, etc.

Process 800 may also include combining failover data and external data to generate a failover record with a score for the failover (step 860). For example, as described above with respect to the failover instruction generation module 650, the high availability failover optimization system 220 may combine the failover data (e.g., the data obtained at steps 810-840) with the external data (e.g., obtained at step 850) to generate a score and a failover record with the score. As described herein, the failover record may identify the attributes of the failover including the attributes of the destination application server cluster 214 where migration occurred, and the score associated with the failover and with the attributes associated with the destination application server cluster 214. In this way, a score is generated for the attributes, and optimal attributes may be determined based on the set of attributes having the highest score.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a computing device, failover data from one or more high availability stacks, wherein the failover data includes data associated with prior failovers associated with the one or more high availability stacks;
scoring, by the computing device, a plurality of prior failovers identified in the failover data;
generating, by the computing device, a failover instruction for implementing a failover based on the scoring; and
causing, by the computing device, and based on the failover instruction, an application to migrate from a target cluster to a destination cluster.

2. The method of claim 1, further comprising detecting a failover trigger, wherein the generating the failover instruction is based on the detecting the failover trigger.

3. The method of claim 1, wherein the scoring of each of the plurality of prior failovers includes generating a record identifying a corresponding score of the prior failover.

4. The method of claim 3, wherein the record identifies attributes of the prior failover.

5. The method of claim 4, wherein the attributes include at least one selected from the group consisting of:
downtime;
migration time;
reliability;
resource cost;
performance;
hardware and software configuration;
network location; and
physical location.

6. The method of claim 1, wherein the scoring each of the plurality of failovers includes scoring a set of attributes associated with each of the plurality of failovers.

7. The method of claim 6, wherein the generating the failover instruction includes selecting a destination application server cluster having attributes with the highest score.

8. The method of claim 1, wherein the failover data includes data relating to the implemented failover after outputting the failover instruction, wherein the failover instruction is a first failover instruction, the method further comprising:
scoring the implemented failover; and
generating a second failover instruction for implementing another failover based on the scoring the implemented failover.

9. The method of claim 1, further comprising generating a report indicating the failover instruction; wherein the report provides a recommendation to migrate a failed application server cluster to a destination application server cluster having an optimal set of attributes.

10. The method of claim 1, wherein a service provider at least one of creates, maintains, deploys and supports the computing device.

11. The method of claim 1, wherein the monitoring, the scoring, and the generating are provided by a service provider on a subscription, advertising, and/or fee basis.

12. The method of claim 1, wherein the computing device includes software provided as a service in a cloud environment.

13. The method of claim 1, further comprising deploying a system for optimizing failovers, comprising providing a computer infrastructure operable to perform the monitoring, the scoring, and the generating.

14. A computer program product for optimizing failovers, the computer program product comprising a computer readable storage medium having program instructions embodied therewith, the program instructions executable by a computing device to cause the computing device to:
generate a respective plurality of scores for a plurality of prior failovers within one or more high availability stacks;
detect a failover trigger for failing over an application from a target application server cluster to one of a plurality of destination application server clusters;
select a particular destination application server cluster of the plurality of destination application server clusters based on the respective plurality of scores and the detecting the failover trigger;
generate a failover instruction that causes the application to migrate from the target application server to the selected particular destination application server cluster.

15. The computer program product of claim 14, wherein the selected particular destination application server cluster includes attributes associated with a highest score of the respective plurality of scores.

16. The computer program product of claim 15, wherein the attributes include at least one selected from the group consisting of:
hardware and software configuration;
network location; and
physical location.

17. The computer program product of claim 14, wherein the selected destination application server cluster is a virtual or physical cluster.

18. The computer program product of claim 14, wherein the failover trigger comprises at least one selected from the group consisting of:
a manual instruction, a time-based trigger;
a performance-based trigger; and
an event-based trigger.

19. A system comprising:
a CPU, a computer readable memory and a computer readable storage medium associated with a computing device;
program instructions to identify attributes of a failover;
program instructions to track migration time of the failover;
program instructions to track performance of applications and services after migration of the failover;
program instructions to track uptime of migrated applications and services;
program instructions to score the failover based on the migration time, the performance, and the uptime, wherein the score indicates a quality of the failover;
program instructions to generate a record that associates the attributes of the failover with the score;
program instructions to generate a failover instruction for a future failover based on the score and one or more other scores associated with other failovers; and
program instructions to output the failover instruction to implement the future failover by causing an application to migrate from a target application server to a destination application server cluster, wherein the program instructions are stored on the computer readable storage medium for execution by the CPU via the computer readable memory.

20. The system of claim 19, wherein the score is further generated based on external data and weightings.

\* \* \* \* \*